Sept. 19, 1961 P. A. BEZZERIDES 3,000,139
MACHINE FOR APPLYING HOT CAPS AND THE LIKE
Filed April 25, 1960 4 Sheets-Sheet 4

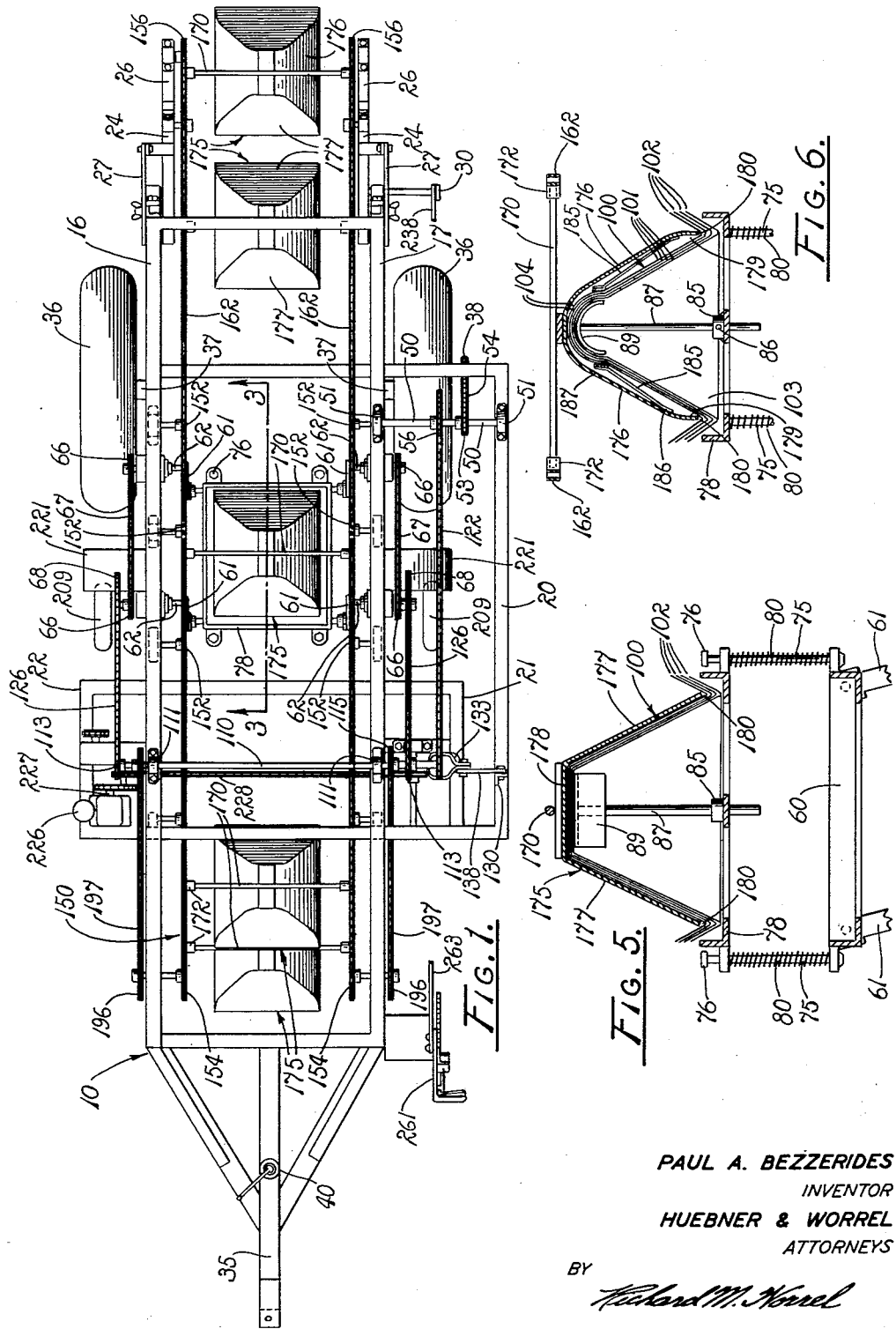

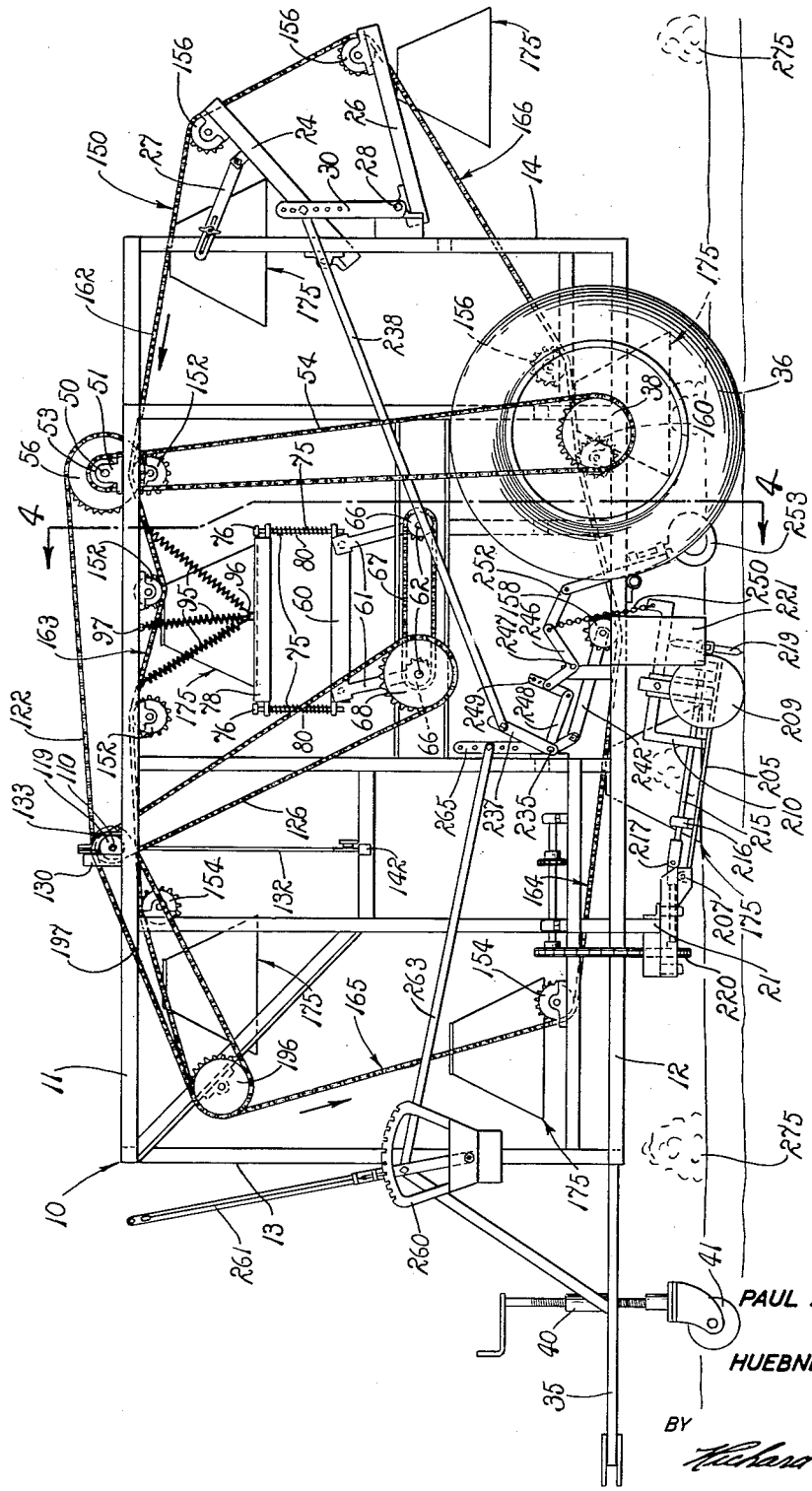

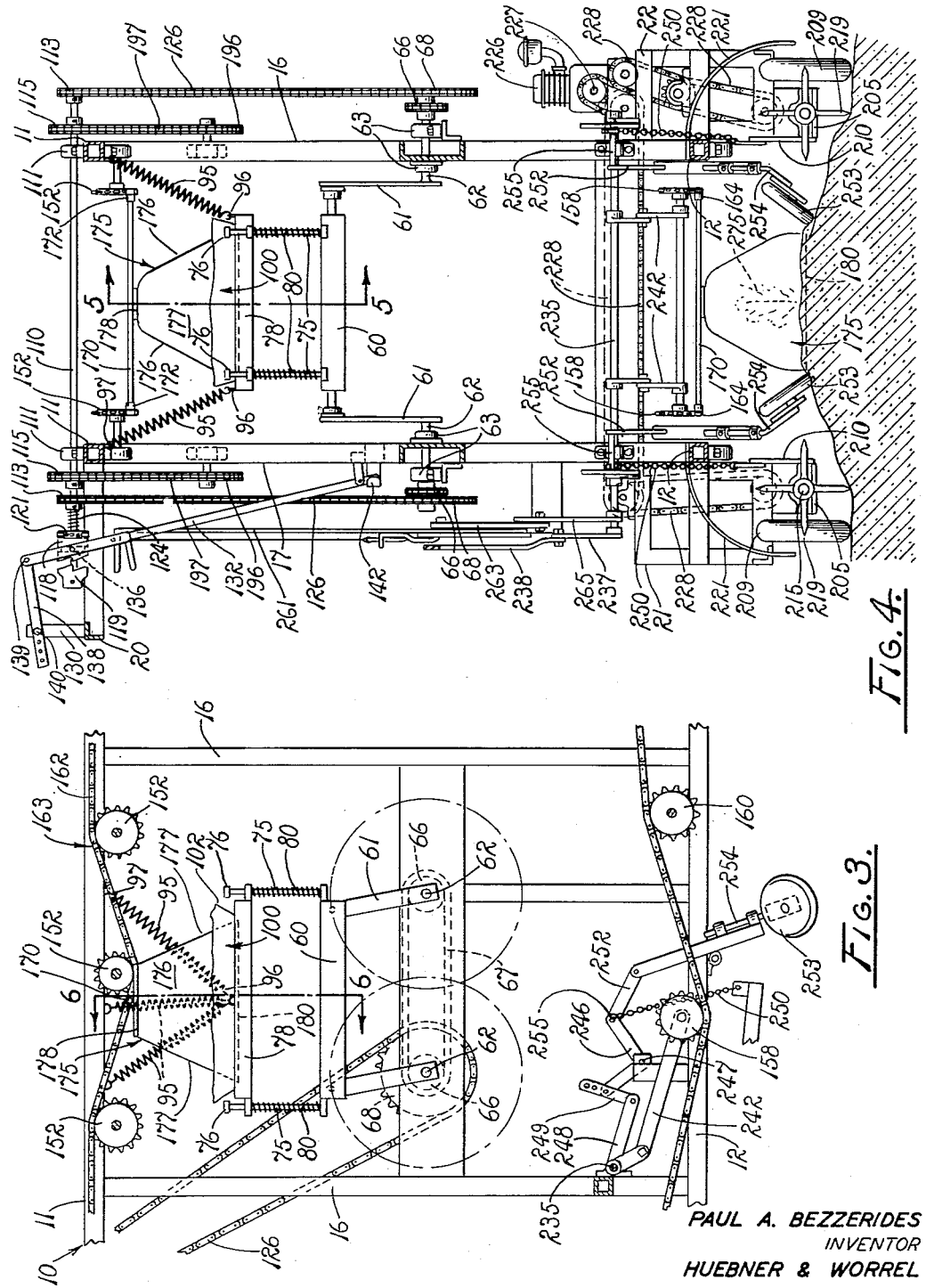

PAUL A. BEZZERIDES
INVENTOR
HUEBNER & WORREL
ATTORNEYS
BY

United States Patent Office 3,000,139
Patented Sept. 19, 1961

3,000,139
MACHINE FOR APPLYING HOT CAPS AND THE LIKE
Paul A. Bezzerides, P.O. Box 1303, Orosi, Calif.
Filed Apr. 25, 1960, Ser. No. 24,566
15 Claims. (Cl. 47—1)

The present invention relates to a hot cap applying machine and, more particularly, to a machine for automatically and individually covering plants longitudinally spaced in a row with hot caps provided for the purpose.

It is well-known to place hot caps over certain row crops, such as tomatoes, in order to protect the plants from freezing. These caps are usually made of thin, flexible paper; are dome- or generally frusto-conical-shape in order to receive the plants therein; and have marginal, laterally extended flanges circumscribing plant receiving openings leading into cavities or chambers within the caps. The magnitude of applying hot caps is appreciated when it is realized that there are usually thousands of plants in an average acreage of plants each of which must be covered with a separate hot cap.

It has been known to use positioning aids for applying the caps over the plants. One successful positioning apparatus is disclosed in my United States Patent No. 2,759,299. In use, said positioning apparatus is held in the hand and thrust down over a stack of hot caps thereby to pick up the uppermost hot cap from the stack. This hot cap is then positioned over the plant to be covered and its marginal flange is covered with dirt to hold the cap against the ground and to facilitate its release from the positioning apparatus. With the exception of the action of the positioning apparatus in picking up and releasing the hot cap, this operation is essentially manual.

However, the described procedure of using a hot cap positioning apparatus is partially mechanized in a machine disclosed in my United States Patent No. 2,452,287. Therein, a frame is provided for earth traversing movement and is adapted to support a stack of hot caps and workmen who remove hot caps from the stack with positioning aids and apply the caps to plants passed over by the frame. Ground engaging rotors are mounted on the frame for throwing dirt inwardly against and over the flanges of the hot caps positioned thereby automatically to assist removal of the caps from the positioning aid and to hold the caps against the ground around the plants. Five workmen are usually required to use this machine effectively.

While such partial mechanization has been satisfactory in certain respects, it is desirable still further to reduce the labor and expense involved in the positioning of hot caps. The essence of the subject invention is the substantially complete automation of the tasks of picking up hot caps from a stack thereof, placing the hot caps against the ground over successive plants in a row, and throwing dirt over the flanges of the caps so positioned. While optional, said dirt covered flanges are even pressed against the ground by the device of the present invention.

Accordingly, it is an object of the present invention to provide an automatic hot cap applying machine.

Another object is to minimize the time and expense involved in the positioning of hot caps on row crops.

Another object is to enable hot caps to be applied individually and successively over longitudinally spaced plants in a row with a minimum of labor.

Another object is automatically to pick up hot caps individually from a stack thereof and to place the same against the ground over plants to be covered.

Another object is automatically to press a hot cap against the ground around a plant covered by the cap.

Another object is to provide an automatic hot cap applying machine which synchronizes application of hot caps in accordance with the spacing between plants in a row.

Another object is to provide a hot cap applying machine which is durable in construction, which is dependable in operation, which is readily adjusted for various crops, spacings thereof, and the like, and which is readily adapted for self-propulsion or for use as a drawn implement.

These, together with other objects, will become more fully apparent upon reference to the following description and accompanying drawings.

In the drawings:

FIG. 1 is a top plan view of a hot cap applying machine embodying the principles of the present invention.

FIG. 2 is a side elevation of the machine shown in FIG. 1.

FIG. 3 is a fragmentary, somewhat enlarged, vertical, longitudinal section taken on line 3—3 in FIG. 1.

FIG. 4 is a somewhat enlarged, transverse vertical section taken on line 4—4 of FIG. 2.

FIG. 5 is a fragmentary, somewhat enlarged, longitudinal vertical section taken on line 5—5 in FIG. 4.

FIG. 6 is a somewhat enlarged, fragmentary, transverse vertical section taken on a plane at a position represented by line 6—6 in FIG. 3.

Figure 7:
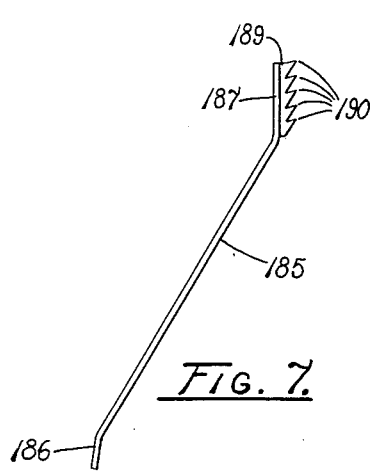
FIG. 7 is a somewhat enlarged, side edge view of one of the spring leaves employed in the hot cap receptacles illustrated in FIG. 6.

Referring more particularly to the drawings, a mobile frame of open construction is indicated by the numeral 10 and includes generally horizontal top and bottom sections 11 and 12, upright front and rear sections 13 and 14, and opposite, laterally spaced, upright side sections 16 and 17. While the frame is shown with said open construction, particularly for illustrative convenience, it will be readily understood that the frame, and the mechanism to be described below, could be enclosed.

The frame also provides an upper, longitudinally extended, lateral support bracket 20 on one of the side sections 17, oppositely extended, lower lateral support brackets 21 and 22 on opposite side sections 16 and 17, as best seen in FIG. 4, and upper and lower rear support brackets 24 and 26 on the rear section 14. The upper rear support bracket is mounted for elevational pivotal movement about a horizontal axis extended transversely of the frame and is held in selected adjusted positions by a brace 27. The lower rear bracket is also elevationally pivotal about a horizontal, transversely extended pivot axis 28. A secondary carrier control lever 30 is rigidly upwardly extended from the lower rear bracket and is movable therewith about said pivot axis 28.

In the illustrated drawn form of the subject machine, an elongated tongue 35 is forwardly extended from the front section 13 of the frame 10. Rear ground support wheels 36 are journaled on axles 37 outwardly extended from the opposite side sections 16 and 17 of the frame. A drive gear 38 is rigidly secured to one of the ground wheels, as illustrated in FIG. 2. A screw-jack 40 is supported in the tongue and swively mounts a wheel 41 for ground engagement. The frame is mounted for earth traversing movement by the ground wheels. The wheel 41 swivels to facilitate lateral adjustment of the frame during connection to the tractor. The jack is utilized for adjusting the elevation of the front of the frame relative to the rear ground wheels. While the frame is illustrated as being adapted to be drawn by another vehicle, it is apparent that the frame could be self-propelled.

A rear, horizontal, transversely extended, idler shaft 50 is rotatably journaled in bearings 51 mounted on the top section 11 and the upper support bracket 20 of the frame 10. A small driven idler gear 53 is connected to the idler shaft in a common vertical plane with the drive gear 38, and a drive chain 54 circumscribes said drive and driven gears thereby to impart rotation to the idler shaft incident to movement of the frame 10 over the ground. A large drive idler gear 56 is also secured to the idler shaft.

With particular reference to FIGS. 2, 3 and 4, a lower substantially rectangular, tie bracket 60 having four corners is mounted in a substantially horizontal position within the frame 10 by pairs of links 61 pivotally connected to opposite sides of the tie bracket. The links are individually rigidly connected to longitudinally spaced, parallel, front and rear pairs of horizontal shafts 62 journaled in the side sections 16 and 17 of the frame by bearings 63. The shafts of each pair which are connected to corresponding, transversely opposed links are in coaxial alignment, while the links on corresponding sides of the tie bracket are in coplanar relation. Furthermore, all of the shafts 62 are located in a substantially common horizontal plane parallel to the tie bracket. The tie bracket therefore pivotally interconnects the links in spaced parallel relation for unitary rotary movement, and the tie bracket, the links, and the frame thereby establish a parallelogram linkage. The tie bracket is thus mounted for revolvable movement in a circuitous path by means of the links rotating about the axes of the shafts.

With reference to FIGS. 2 and 4, coupling gears 66 are secured to the outer ends of the shafts 62, and the coupling gears on corresponding sides of the frame 10 are in coplanar relation thereby accommodating coupling chains 67 extended therearound. The front pair of coaxial shafts 62, as illustrated in FIG. 2, also mount driven gears 68 outwardly of the coupling gears.

A plurality of slide rods 75 are rigidly upwardly extended from the corners of the tie bracket 60 and provide upper heads 76. An upper substantially rectangular platform 68 has corners individually, elevationally slidably fitted on the slide rods between the tie bracket and the heads of the rods for elevational adjustable movement in a horizontal attitude toward and away from the tie bracket. Lower compression springs 80 individually encircle the slide rods and have opposite ends bearing against the upper plafform and the tie bracket thereby yieldably urging the platform away from the tie bracket. Both the tie bracket and the platform are conveniently of rectangular, open frame construction.

As best illustrated in FIGS. 5 and 6, a bushing 85 is secured substantially centrally to the platform 78 and is provided with a radially adjustable setscrew 86. An elongated center post 87 is longitudinally and rotatably slidably fitted in the bushing and is held in selected positions by the setscrew. A semi-circular cap engaging plate 89 is symmetrically mounted in inverted position on the top of the post.

With reference to FIGS. 2, 3 and 4, a plurality of upper tension springs 95 are provided on each side of the frame 10. Each set of tension springs has convergent lower ends 96 connected to its correspondingly adjacent side of the platform 78 and divergent upper ends 97 likewise connected to its corresponding side of the top section 11 of the frame. These tension springs yieldably urge the platform upwardly toward the top section 11 of the frame but are of sufficient elasticity to permit said platform to be depressed against the urgence of the compression springs 80 toward the tie bracket 60.

The platform 78 is therefore mounted in a horizontal attitude by the links 61 for cycling movement in a circuitous path about the shafts 62 intermittently through an upper cap pickup position wherein the links are vertically upwardly extended from their respective shafts, thence forwardly downwardly to a lower position with the links extended vertically downwardly, and return rearwardly and upwardly toward said upper position. It is evident that the links rotate through 360° in carrying the platform through its circuitous path.

It is well to note at this point that the platform 78 is adapted to support a stack of hot caps 100 in separably nested relation, as best seen in FIGS. 5 and 6. Each cap has a concavo-convex body 101 of substantially cone- or frusto-conical-shape and a marginal flange 102 circumscribing a plant-receiving opening 103 for the cap. The stack of caps are positioned on the platform with their openings downwardly disposed, with the flange of the lowermost cap rested on the platform adjacent to its rim, and with the top 104 of said lowermost cap complementarily internally engaged by the plate 89. It is evident that the center post 87 is elevationally adjustable to accommodate various sizes of hot caps.

A front idler shaft 110 is rotatably journaled on the top section 11 of the frame 10 by bearings 111 and in forwardly spaced, substantially parallel relation to the rear idler shaft 50, as best illustrated in FIGS. 1 and 2. Platform drive gears 113 are secured to the front idler shaft at opposite ends thereof, as seen in FIG. 1, and carrier drive gears 115 are connected to this same idler shaft in inwardly adjacent relation to the platform gears.

With particular reference to FIG. 4, a drive clutch member 118 is rigidly secured to the end of the front idler shaft 110 overhanging the upper support bracket 20. A complementary driven clutch member 119 is axially slidably fitted on the front idler shaft in opposed relation to the drive clutch member for movement between a clutching position engaged with the drive clutch member and a released position, as illustrated in FIG. 4, separated from the drive clutch member. A driven idler gear 121 is secured to the driven clutch member, and an idler chain 122 is extended about the driven idler gear and the large drive idler gear 56. A compression spring 124 encircles the shaft 110 between the driven idler gear and the adjacent platform gear 113 for yieldably urging the clutch members into clutching position. Platform drive chains 126 are extended about corresponding platform drive gears 113 and driven gears 68.

Figure 9:
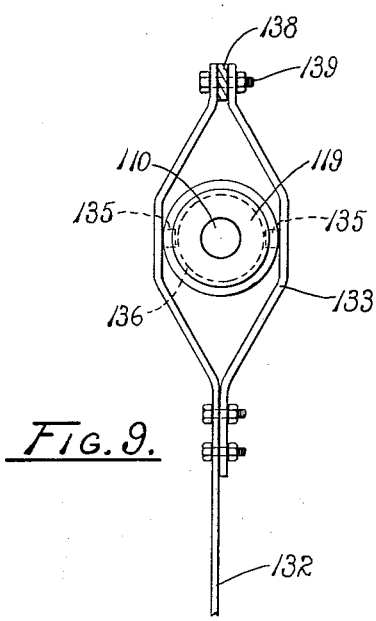
FIG. 9 is a somewhat enlarged, fragmentary view of a clutch mechanism illustrated in side elevation in FIG. 4.

A standard 130 is upwardly extended from the upper lateral support bracket 20 in approximately the same vertical plane as the front idler shaft 110. An elongated drive control handle 132 includes a yoke portion 133, best seen in FIG. 9, circumscribing the drive clutch member 118. Coaxially aligned pivot studs 135 are inwardly extended from the yoke portion and are slidably fitted in an annular groove 136 in the drive clutch member. An elongated link 138 provides an inner end pivotally connected to the upper end of the drive control handle by means of a pivot pin 139 and an outer end longitudinally adjustably pivotally connected by pivot pin 140 to the standard 130. The drive control handle is thus mounted for pivotal movement about the pin 139 relatively inwardly and outwardly with respect to the side section 17 of the frame 10. Outward movement of the drive control handle moves the drive clutch member axially outwardly on the shaft 110 into clutching position while inward movement of each handle disengages the clutch members 118 and 119. A hook 142 is mounted on the side section 17 and releasably receives the lower end of the control handle in its inwardly pivoted position, as illustrated in FIG. 4, for releasably holding the clutch members in released or disengaged position. The groove 136 allows rotation of the drive clutch member relative to and within the yoke portion of the handle when the clutch members are engaged.

A hot cap carrier 150 includes transversely opposed pairs of upper depressing sprockets 152, front guide sprockets 154, rear guide sprockets 156, lower depressing sprockets 158, and lower lifting sprockets 160, rotatably mounted in the frame 10. The sprockets on corresponding sides of the frame are located in a substantially common vertical plane extended longitudinally of the frame. The upper depressing sprockets include front and rear sprockets, and intermediate sprockets having downwardly disposed peripheries below the upwardly disposed peripheries of the front and rear depressing sprockets. The common axis of the intermediate depressing sprockets is located in a vertical plane disposed transversely of the frame equidistantly between the front and rear pairs of shafts 62. Therefore, when the platform 78 is in its cap pickup position, as described above, said plane of the axis of the intermediate sprockets bisects the platform. Further, the lower depressing sprockets have downwardly disposed peripheries below the upwardly disposed peripheries of the lifting sprockets. Elongated, transversely spaced, endless, flexible conveying chains 162 are individually trained around the coplanar sprockets on each side of the frame for movement in circuitous paths defined by the sprockets. The chains of the carrier thus provide an upper longitudinal run 163 above the upper platform 78, a lower longitudinal run 164 upwardly adjacent to earth traversed by the frame 10, and front and rear runs 165 and 166, respectively. It is to be noted that the upper run passes over the front and rear upper depressing sprockets and under the intermediate upper depressing sprockets. The lower run passes under the lower depressing sprockets and over the lower lifting sprockets.

The carrier 150 further includes elongated, rigid bars 170 rotatably journaled in bearings 172 individually connected to the chains 162. The bars extend transversely between the chains and are in substantially equally longitudinally spaced relation therealong. It is further to be observed that the bars are substantially horizontal and in parallel relation to each other. Dome-shaped hot cap holding receptacles 175 provide opposed arcuate side panels 176, and substantially flat end panels 177 interconnecting the side panels. Said panels are divergently downwardly extended from a closed top portion 178 of the receptacle to an open bottom 179 circumscribed by a substantially rectangular edge 180. The top portions of the receptacles are individually rigidly connected to the bars substantially equidistantly between the bearings 172 so that the end panels are disposed forwardly and rearwardly and so that the receptacles are substantially symmetrical about a vertical plane extended longitudinally of the frame and bisecting the upper platform 78 and therefore the center post 87. This relationship is evident in FIG. 1. The receptacles are thus mounted on the chains with their open bottoms disposed downwardly and for forward and rearward swinging movement about their respective horizontal axes extended transversely of the frame. As best evident in FIG. 2, this mounting maintains the lower edge 180 of each hot cap receptacle in a substantially horizontal plane inasmuch as the receptacles freely gravitate into such positions. As will be seen hereinafter, the receptacles are moved forwardly along the upper run 163 and rearwardly along the lower run 164. As the receptacles travel forwardly along the upper run, they move under the intermediate depressing sprockets 152 wherein they are located above and between the front and rear pairs of shafts 62 about which the platform 78 revolves. This position of each receptacle is also referred to as its cap pickup position. As the receptacles move rearwardly along the lower run, they successively pass under the lower depressing sprockets 158 and this is referred to hereinafter as their cap applying positions.

It is further to be noted that the receptacles 175 complementarily receive the hot caps 100 therein, as best illustrated in FIGS. 5 and 6, with the top 104 of each cap upwardly against the top portions of the receptacle and with the lower edge of the receptacle engaging the cap in the circumferential channel formed between the body 101 of the cap and its flange 102.

Figure 8:
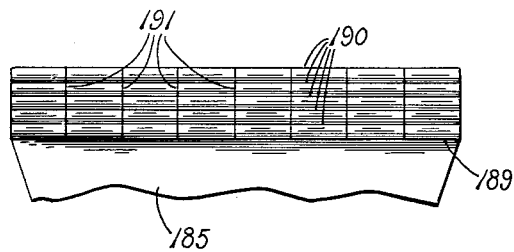
FIG. 8 is a fragmentary face view of a portion of the spring leaf illustrated in FIG. 7.

As best seen in FIGS. 6, 7 and 8, a pair of elongated, resiliently flexible spring leaves 185, having substantially the shape of a flattened S or ogee, provide lower mounted ends 186 connected internally to the opposed side panels 176 of each receptacle 175 and transversely opposed cap engaging ends 187 convergently inwardly extended in adjacent spaced relation to the side panels to which their mounted ends are connected. Friction pads 189 are secured in opposed relation to the cap engaging ends of the leaves and these pads are preferably provided with upwardly directed serrations or teeth 190. Preferably the teeth are slit along transverse lines 191 to enhance their gripping ability over the entire lengths of the teeth. Operating on a principle similar to that described in my Patent No. 2,759,299, the hot cap receptacles 175 are thrust down against a stack of hot caps 100 whereupon the cap engaging pads 189 on the spring leaves frictionally engage the body 101 of the uppermost cap. When the receptacle is pulled away from the stack of hot caps, the receptacle removes the uppermost hot cap from the stack inasmuch as it is frictionally engaged between the resilient spring leaves.

Driven gears 196 are individually connected to the upper front guide sprockets 154, and elongated, endless drive chains 197 individually extend around the carrier drive gears 115 and the driven gears 196 on corresponding sides of the frame 10. Since all of the sprockets 152, 154, 156, 158 and 160 are connected by the carrier chains 162, rotation is imparted to all of the sprockets and the chains are motivated upon rotation of the front idler shaft 110. Therefore, both the platform 78 and the carrier 150 are synchronously driven in their individual circuitous paths incident to ground travel of the frame and assuming that the clutch members 118 and 119 are in engagement. The driving connections are such as to move the upper run 163 of the chains 162 in a forward direction and the lower run 164 in a rearward direction, and to rotate the platform links 61 in a counterclockwise direction, as viewed in FIGS. 2 and 3.

Elongated mounting plates 205 are pivotally supported on the lower support brackets 21 and 22 of the frame 10 for elevational adjustable movement about axially aligned, substantially horizontal pivot axes 207. Plate support wheels 209 are individually rotatably coaxially mounted on the plates rearwardly of the pivot axes 207. Support brackets 210 are secured to the mounting plates and upwardly extended therefrom opposite to the support wheels.

Elongated, articulated driven shafts 215 are rotatably journaled in bearings 216 on the mounting plates 205 and include universal joints 217. Rotor blades 219 are secured to rear ends of the driven shafts, and driven sprockets 220 are secured to forward ends of these shafts. The rotor blades are located on opposite sides of the lower run 164 of the carrier 150 and approximately in the same vertical plane as the lower depressing sprockets 158, as best seen in FIG. 2. Also, the blades are elevationally adjustable incident to corresponding adjustment of their respective mounting plates 205. Arcuate rotor shields 221 are secured to the side sections 16 and 17 of the frame and extend laterally outwardly and downwardly around the rotor blades on opposite sides of the frame 10.

A gasoline engine 226 is borne by the lower lateral support brackets 22 and includes an output shaft 227. Sprockets and chains, generally indicated by the numeral 228, drivingly connect the output shaft of the engine to the driven sprockets 220 so as to rotate the driven shafts 215 and their connected rotor blades 219 in opposite directions. More specifically, by refernce to FIG. 4, the left rotor blade is rotated in a counterclockwise direction while the right rotor blade is rotated in a clockwise direction. When the blades are in earth engagement, it is evident that rotation of the blades throws engaged earth upwardly and inwardly of the frame 10.

An elongated rock shaft 235 is rotatably journaled in the frame 10 in a plane above the mounting plates 205. The rock shaft is substantially horizontal and extended transversely of the frame. A primary carrier control lever 237 is rigidly upwardly extended from the rock shaft, as seen in FIGS. 2 and 4, and elongated carrier control link 238 pivotally interconnects the primary control lever and the secondary carrier control lever 30. Preferably, the latter is provided with suitable holes for various adjustments of the connection with the link 238. It is evident that rotation of the rock shaft moves the rear lower support bracket 26 upwardly and downwardly to increase or decrease tension on the carrier chains 162.

Articulated sprocket mounting arms 242 provide forward portions rigidly connected to the rock shaft 235 and rearward portions pivoted to their forward portions and individually rotatably mounting the lower depressing sprockets 158. The rock shaft and arms serve as convenient means for holding the lower depressing sprockets in mesh with the chains. These lower depressing sprockets are weighted gravitationally to urge the lower run 164 of the carrier 150 downwardly thereunder.

Bell cranks 246 are pivotally connected to the side sections 16 and 17 of the frame 10 rearwardly of the rock shaft 235 by means of pivot pins 247. Bars 248 are rearwardly rigidly extended from the rock shaft 235, and links 249 adjustably pivotally interconnect these bars and the forwardly disposed legs of the bell cranks. Elongated chains 250 interconnect the brackets 210 on the mounting plates 205 and the rearward legs of the cranks on corresponding sides of the frame. Therefore, rotation of the rock shaft also serves to pivot the bell cranks about their pivot pins 247 and thereby raise and lower the rearward end portions of the mounting plates relative to the pivot axes 207.

Elongated, articulated, roller mounting arms 252 have upper portions pivoted to the rearward legs of the bell cranks 246 and lower portions individually pivotally connected to the lower edges of the opposite side sections 16 and 17 rearwardly of the plate support wheels 209 but forwardly of the axles 37. The mounting arms are pivotal about common horizontal axes extended transversely of the frame. Rollers 253 are rotatably mounted on angulated shanks 254 individually elevationally adjustably borne by the lower portions of the arms 252 for rotation about axes inwardly acutely angularly inclined with respect to the horizontal, as best seen in FIG. 4. The rollers are thus in downwardly convergent relation to each other inwardly of the wheels 209 and individually substantially under the chains 162 of the carrier 150. The downwardly disposed peripheries of the rollers are spaced transversely of each other by approximately the maximum transverse width of the hot caps 100, for a purpose to be described. During earth traversing movement of the frame, the rollers are adapted for rolling engagement with the ground passed over by the frame. It is to be noted that cross bars 255 effect the pivotal interconnection of the upper portions of the mounting arms and the bell cranks. Thus, rotation of the rock shaft 235 also pivots the mounting arms about their respective axes for raising or lowering the rollers 253.

A quadrant 260 is mounted at the forward end of the frame 10 and a master control lever 261 is pivotally supported in the quadrant and extended upwardly therefrom. An elongated link 263 pivotally interconnects the master control lever and a master control arm 265 rigidly upwardly extended from the rock shaft 235. By moving the master control lever forwardly and rearwardly, the rock shaft is rotated in opposite directions to adjust the tension on the chains 162, and to raise and lower the rotor blades 219 and the pressing rollers 253.

Operation

The operation of the described embodiment of the present invention is briefly summarized at this point.

The tongue 35 is connected to a draft vehicle, such as a tractor, not shown. The screw-jack 40 is adjusted elevationally to adjust the forward end of the frame 10, if required to facilitate such connection. The wheel 41 is removed from the screw-jack after connection to the tractor and during use of the subject machine. A stack of hot caps 100 is placed on the platform 78 over the center post 87. The master control lever 261 is moved forwardly thereby to slacken the rear run 166 of the chains 162, and to lower the rotor blades 219 and the rollers 253 into ground engagement. The lower depressing sprockets 158 urge the lower run 164 downwardly thereunder incident to said slackening of the rear run. The drive control handle 132 is removed from the hook 142 to allow the clutch members 118 and 119 to engage, and the gasoline engine 226 is started thereby to rotate the blades 219.

For descriptive convenience, it is assumed that initially the platform 78 and one of the receptacles 175 are located in their cap pickup positions. Thus, said one receptacle is fitted over the stack of hot caps 100 with the pads 189 of the spring leaves 185 frictionally engaging opposite sides of the uppermost hot cap in the stack. It is to be observed that the receptacle bears downwardly on the platform to compress the springs 80 and slightly to elongate the springs 95. This insures complete fitting of the stack of hot caps upwardly into the receptacle and also insures frictional engagement of the pads with the sides of the uppermost hot cap. Even with only a single hot cap on the platform, the receptacle still slightly depresses the platform so that even this last hot cap is properly fitted within the receptacle between its spring leaves. The receptacle begins to depress the platform as it moves from the rear pair of upper depressing sprockets toward the intermediate depressing sprockets where the compression is the greatest. The compression is relieved as the receptacle travels forwardly from the intermediate depressing sprockets as is believed evident.

The frame 10 is moved forwardly thereby to move the upper run 163 of the carrier 150 forwardly and to rotate the platform 78 in a counterclockwise direction because of rotation of the ground wheels 36. Both of said receptacle 175 and said platform in the cap pickup position move forwardly. Since the platform is thereby also moved downwardly and the receptacle upwardly along their respective paths, the receptacle and the platform separate whereby the leaves 185 in the receptacle pick up the uppermost hot cap 100 in the stack and carry it forwardly along the upper run.

The receptacle 175 carries the hot cap 100 grasped therewithin downwardly along the forward run 165 and thence rearwardly along the lower run 164. As the frame 10 travels forwardly over a row of plants 275 to be covered, the carried hot cap gradually fits downwardly over one of the plants in a row and both the plant and the receptacle, including the carried hot cap, relatively approach the lower depressing sprockets 158 together, that is, at the same rate of speed. At the hot cap applying position, previously referred to, the lower edge 180 of the receptacle carrying the hot cap presses the flange 102 of this hot cap against the ground around the enclosed plant. Simultaneously, the rotor blades 219 throw encountered dirt over the flange on opposite sides of the applied cap.

As the frame 10 continues forwardly and immediately after the receptacle 175 and its carried hot cap 100 pass rearwardly of the hot cap applying position, the rollers 253 ride over the flanges 102 which have been overlaid with dirt. The receptacle travels upwardly along the rear run 166 of the carrier 150 and the rollers and dirt hold the applied hot cap 100 against the ground and around the plant 275. This allows the pads 189 of the spring leaves 185 to slip upwardly along the opposite sides of the hot cap thereby to enable separation of the receptacle from the applied hot cap. In most instances the dirt alone is sufficient to hold the cap against the ground as the receptacle travels upwardly. The rollers are shown and described herein but are not required nor used in certain commercial embodiments of the subject machine.

As each receptacle 175 approaches the hot cap pickup position along the upper run 163, the platform 78 simultaneously moves from its lower position upwardly into its said hot cap position. The timing is such as to fit the stack of hot caps 100 into the approaching receptacle so that both the platform and the receptacle reach their hot cap pickup positions at the same time. Thus, hot caps 100 are individually picked up from the stack of hot caps on the platform by the receptacles as they travel along the upper run. Of course, the receptacles successive apply the hot caps over the plants 275 in a row, as described above. The receptacles are spaced longitudinally along the chains 162 corresponding to the spacings between the plants in a row. Inasmuch as the speeds of travel of the carrier 150 and the platform 78 are controlled by the ground wheel 36, the receptacles always fit over successive plants in the row regardless of the speed of travel of the frame. It is evident that the carrier and platform could be driven by a separate power supply borne by the frame 10 or by a power take-off on a draft appliance, not shown, in order to obtain adjustably controlled speeds of movement of the carrier and platform. While the plants 275 illustrated are shown in a stage wherein they have above-ground growth, it is to be understood that the subject machine could be used to apply hot caps over seeds planted in the ground. In commercial embodiments of the subject machine, seeding attachments are connected to the front of the machine whereby hot caps are applied over the seeds immediately after planting thereof.

From the foregoing, it will be evident that the described hot cap applying machine offers a very rapid and convenient means for applying hot caps to a large number of plants in a relatively short period of time. Actually, only one man is required to drive the tractor pulling the machine, or the hot cap applying machine if it is self-propelled. The hot caps are automatically picked off from the platform 78 and applied over the plants without manual intervention. In practice, the machine demonstrates that it is excellently suited for the described purposes.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A machine for applying hot caps over plants longitudinally spaced in a row comprising means for supporting hot caps; means mounting the cap supporting means for earth traversing movement longitudinally over such a row of plants; hot cap carrier means including a plurality of hot cap receptacles adapted to receive such hot caps complementarily therein; means supporting the carrier means on the mounting means for movement sequentially past said cap supporting means and thence along a predetermined path in upwardly adjacent relation to and longitudinally of such row of plants during such earth traversal for first removing hot caps from said supporting means and then applying the removed hot caps successively over plants in said row; and earth engaging means borne by the mounting means laterally adjacent to the carrier means and said predetermined path thereof for depositing dirt around the caps applied to the plants, said dirt being adapted to bear downwardly against the applied caps for enabling removal of the caps from the receptacles and for holding such caps over the plants.

2. In a machine for applying hot caps over plants longitudinally spaced in a row, an elongated frame mounted for earth traversing movement longitudinally of the frame and of such a row; means borne by the frame for supporting hot caps; a plurality of hot cap receptacles; and means mounting the receptacles in the frame for movement in a circuitous path circumscribing a substantially horizontal axis extended transversely of the frame and for travel laterally adjacent to said hot cap supporting means and thence laterally adjacent to the ground traversed by the frame for successively removing hot caps from the supporting means and for successively placing the same over the plants in the row.

3. In a machine for positioning a hot cap on the ground, such hot cap having a concavo-convex body and a flange marginally extended from the body, an elongated frame, means mounting the frame for earth traversing movement longitudinally of the frame; a platform mounted in the frame adapted to support such a hot cap thereon; a concavo-convex hot cap receptacle; means mounting the receptacle in the frame for movement in a predetermined circuitous path circumscribing a substantially horizontal axis extended transversely of the frame successively past the platform for picking up the hot cap thereon, thence over and closely adjacent to earth traversed for setting such hot cap on the ground with its flange against the ground and its body upwardly arched from the ground, and return; and earth engaging means borne by the frame adjacent to the path of movement of the receptacle as it is moved closely adjacent to earth traversed for throwing dirt onto the flange of the cap as it is set on the ground by the receptacle thereby to remove the cap from the receptacle and to hold the same against the ground.

4. In a machine for applying hot caps individually over plants in a row, said hot caps having plant receiving openings, an elongated mobile frame adapted for movement longitudinally thereof over such a row of plants; a support member adapted to support a stack of hot caps in separably nested relation; means mounting the support member in the frame so that the hot cap openings face downwardly and for travel in a circuitous path about a substantially horizontal axis extended transversely of the frame; a plurality of hot cap receptacles each having an open cavity therein adapted complementarily releasably to receive a hot cap therein; means mounting the receptacles in the frame with their cavities opening downwardly and in longitudinally spaced relation therealong and for travel in a circuitous path circumscribing the path and the axis of the support member, the path of the receptacles provided by said mounting means including an upper run above said support member and a lower run below the support member adapted to extend above a row of plants traversed by the frame; and power driven coupling means borne by the frame and interconnecting said support member and receptacle mounting means for moving the receptacles in a predetermined direction in said upper run and for moving the support member upwardly toward and in the same direction as each receptacle when traveling along its upper run whereby said stack of hot caps are successively inserted into the receptacles, the receptacles being individually adapted to pick up a single hot cap from the stack and to place such caps successively over plants in the row during travel along said lower run.

5. In a machine for applying dome-shaped hot caps over plants longitudinally spaced in a row, said caps having marginal flanges circumscribing plant-receiving openings; an elongated frame; means supporting the frame for movement longitudinally thereof over the row of plants; a hot cap suppotring platform; means mounting the platform in the frame in a substantially horizontal attitude and for cycling movement about a substantially horizontal axis extended transversely of the frame and in a circuitous path through an upper cap pickup position, thence downwardly, and return, said platform being adapted to support a stack of hot caps in separably nested relation with their openings downwardly disposed; an elongated endless flexible carrier member; means mounting the carrier member in the frame in circumscribing relation to the platform and to said platform axis, the carrier member including upper and lower runs extended longitudinally of the frame respectively above the platform and upwardly adjacent to earth traversed by the frame; a dome-shaped receptacle connected to the carrier member, having a downwardly disposed cap opening, and being carried by the carrier member along said upper run past a cap pickup position with said cap opening in opposed relation to the platform and along said lower run past a cap applying position with said cap opening in opposed relation to earth traversed by the frame; powered driving means borne by the frame and having driving connection to the platform mounting means and the carrier member for synchronously moving the platform upwardly toward and in the same direction as the receptacle as they approach said pickup positions and for bringing the cap opening in the receptacle into opposed upwardly adjacent spaced relation to the platform in said pickup positions whereby such a stack of caps on the platform are inserted into the receptacle; means mounted in the receptacle for frictionally grasping the uppermost cap in the stack in said pickup positions and for removing such cap from the stack as the receptacle and the platform move out of said pickup positions, the removed cap being carried by the receptacle into said cap appling position wherein the cap is adapted to fit over a plant in said row; and ground engaging means borne by the frame adjacent to the lower run of the carrier member and to said cap applying position of the receptacle for throwing earth engaged onto the flange of the cap fitted over the plant thereby to hold the cap against the ground and to separate the cap from the receptacle as the latter continues along said lower run.

6. The machine of claim 5 wherein the platform mounting means includes elongated links pivotally mounted in the frame for rotary movement about longitudinally spaced substantially horizontal and parallel axes extended transversely of the frame, a tie member pivotally interconnecting the links for unitary movement in substantially parallel relation, slide rods upwardly extended in substantially rectangular relation from the tie bracket, the platform being elevationally slidably borne by the rods, resilient compression means interposed the platform and the bracket yieldably urging the platform away from the bracket, and resilient tension means interconnecting the platform and the frame thereabove for yieldably urging the platform into said upper pickup position; and a post upwardly extended from the platform adapted to fit within and bear upwardly against the innermost hot caps on the platform whereby the stack of hot caps are compressed between the post and the receptacle in said pickup positions.

7. The machine of claim 6 wherein the upper run of the carrier member dips downwardly toward the platform in its pickup position and between the pivot axes of the links.

8. The machine of claim 5 wherein said frame supporting means includes a ground engaging wheel rotatable during earth traversing movement of the frame; and wherein said powered driving means is coupled to the wheel for imparting driving movement to the platform mounting means and to the carrier member incident to earth traversing movement of the frame.

9. The machine of claim 8 including clutch means borne by the frame releasably interconnecting said driving means and the wheel having an engaged position effecting driving connection of the platform mounting means and carrier member by the wheel and released position wherein said platform mounting means and carrier member are not motivated by rotation of the wheel.

10. The machine of claim 5 including rollers mounted in the frame and extended downwardly therefrom on opposite sides of the lower run of the carrier member for engagement with dirt overlying the flange of the cap thereby to assist in removal of the cap from the receptacle and further to urge the dirt against the flange for securely holding the cap against the ground around the plant.

11. The machine of claim 4 wherein said carrier member includes a pair of transversely spaced, endless flexible chains individually in upright planes extended longitudinally of the frame, and a plurality of elongated bars rotatably journaled in and extended between the chains in longitudinally spaced relation therealong; wherein said carrier mounting means includes a plurality of sprockets rotatably borne by the frame and in mesh with the chains to provide said upper and lower runs; and wherein there are a plurality of said receptacles individually rigidly connected to the bars intermediate said chains; and wherein said platform mounting means mounts the platform between the vertical longitudinally extended planes of the chains.

12. The machine of claim 4 wherein resiliently flexible spring leaves have lower portions connected internally of the receptacles and upper end portions upwardly extended within the receptacles in opposed relation to each other transversely of the upper and lower runs thereby resiliently to engage the uppermost hot cap in such stack on opposite sides of said cap.

13. The machine of claim 12 wherein friction pads are secured to the upper end portions of the leaves having upwardly extended elongated teeth longitudinally extended transversely of the leaves, the pads being slit transversely of the teeth.

14. In a machine for applying hot caps individually over plants in a row, said hot caps having plant receiving openings, an elongated mobile frame adapted for movement longitudinally thereof over such a row of plants; a hot cap support member; means mounting the support member in the frame for travel in a circuitous path about a substantially horizontal axis extended transversely of the frame; a plurality of hot cap receptacles each having an open cavity therein adapted releasably to receive a hot cap therein; means mounting the receptacles in the frame for travel in a circuitous path circumscribing a substantially horizontal axis in substantially parallel relation to the axis of movement of the support member, the path of the receptacles provided by said mounting means including an upper pickup run laterally adjacent to said support member and lower run adapted to extend above a row of plants traversed by the frame; and power driven coupling means borne by the frame and interconnecting said support member and receptacle mounting means for moving the receptacles in a predetermined direction in said upper run and for moving the support member in the same direction as each receptacle when traveling along its upper run whereby said receptacles successively fit over hot caps, the receptacles being individually adapted to remove hot caps from the member and to place such caps successively over plants in a row during travel along said lower run.

15. In a machine for applying hot caps individually over plants in a row, said hot caps having plant receiving openings, an elongated mobile frame adapted for movement longitudinally thereof over such a row of plants; a plurality of hot cap receptacles each having an open cavity therein adapted releasably to receive a hot cap therein; means mounting the receptacle in the frame for travel in a circuitous path circumscribing a substantially horizontal axis and including an upper hot cap pickup run and a lower run adapted to extend over a row of plants traversed by the frame; means borne by the frame for delivering hot caps to the receptacles during travel thereof along said pickup run; and power driven coupling means supported by the frame and interconnecting said delivering means and said receptable mounting means for moving the receptacles in a predetermined direction in said upper run and for moving the delivering means toward and in the same direction as the receptacles when traveling along said upper run whereby said hot caps are successively fitted into the receptacles; and means mounted on the frame adjacent to the lower run of the receptacles for removing the hot cap from the receptacles as they are placed over plants in such a row during travel along said lower run.

References Cited in the file of this patent
UNITED STATES PATENTS

| | | |
|---|---|---|
| 1,357,523 | Schindler | Nov. 2, 1920 |
| 1,887,387 | Wright | Nov. 8, 1932 |
| 2,452,287 | Bezzerides | Oct. 26, 1948 |